A. KADOW.
MANUFACTURE OF HOLLOW GLASS ARTICLES.
APPLICATION FILED DEC. 28, 1916.

1,221,332.

Patented Apr. 3, 1917.
3 SHEETS—SHEET 1.

INVENTOR
August Kadow
BY
Barnett Truman
ATTORNEY

A. KADOW.
MANUFACTURE OF HOLLOW GLASS ARTICLES.
APPLICATION FILED DEC. 28, 1916.

1,221,332.

Patented Apr. 3, 1917.
3 SHEETS—SHEET 2.

INVENTOR
August Kadow
BY
Barnett Johnson
ATTORNEY

A. KADOW.
MANUFACTURE OF HOLLOW GLASS ARTICLES.
APPLICATION FILED DEC. 28, 1916.
1,221,332. Fig.4. Patented Apr. 3, 1917.
3 SHEETS—SHEET 3.
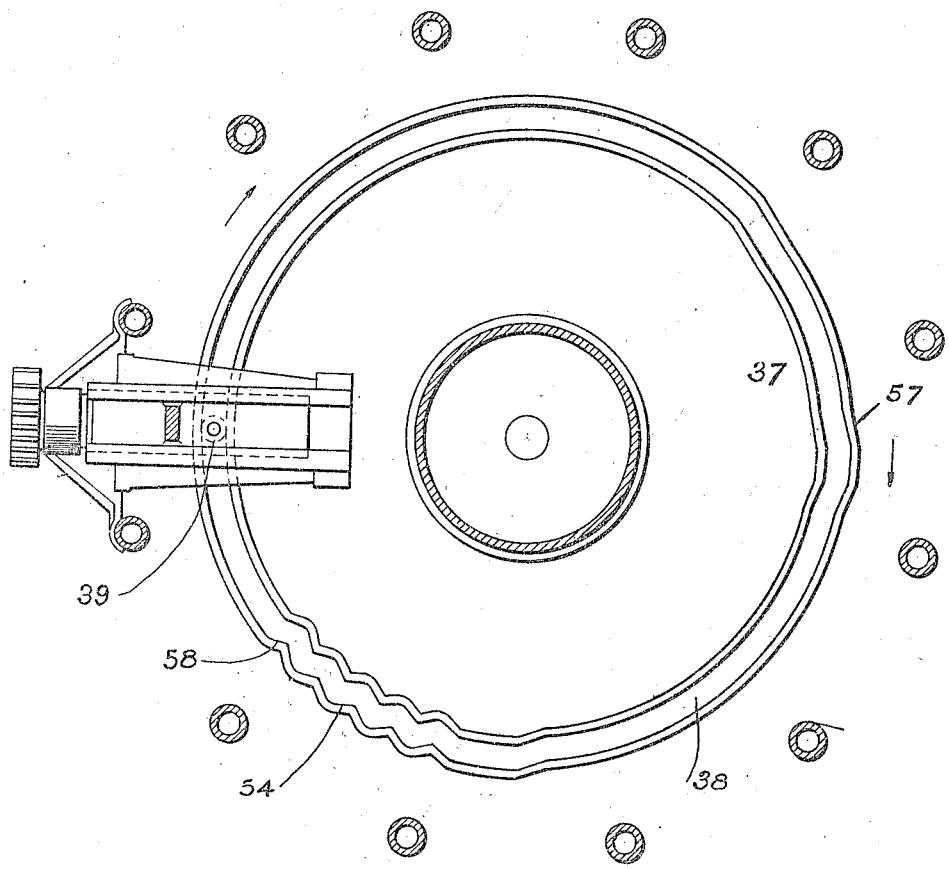
INVENTOR
August Kadow.
BY
Barnett Pomman
ATTORNEY

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

MANUFACTURE OF HOLLOW GLASS ARTICLES.

1,221,332.     Specification of Letters Patent.     Patented Apr. 3, 1917.

Application filed December 28, 1916. Serial No. 139,422.

*To all whom it may concern:*

Be it known that I, AUGUST KADOW, a citizen of the United States, residing at Toledo, in the county of Lucas and State of Ohio, have invented certain new and useful Improvements in the Manufacture of Hollow Glass Articles, of which the following is a specification.

My invention relates to the manufacture of hollow glass articles and is illustrated as adaptable for use with the machine disclosed in my co-pending application Serial No. 570,621, filed July 6, 1910, and the modification thereof disclosed in my co-pending application Serial No. 731,956, filed November 18, 1912, and in my British Patent No. 26,222 of 1911. In the aforesaid applications I have shown and described apparatus for manufacturing glass articles, such as electric light bulbs, comprising a rotating support provided with a plurality of sets of glass forming apparatus which operate successively to gather glass from a glass furnace and form the gathers into hollow articles of the desired shape. Each set of glass forming devices comprises a gathering ram which gathers the glass from the glass furnace in the form of a solid blank, a spindle or blow pipe which receives the gather from the ram and blows it into hollow form, and a finishing mold which incloses the blank, while held by the spindle, during the later stages of the manufacture.

After the blank has been blown initially to hollow form and before it is inclosed by the mold, it is subjected to a process of elongation by gravity, the spindle being inverted so that the blank hangs downwardly therefrom. In the machine disclosed in my co-pending applications above referred to the elongation of the blank is accomplished by a swinging movement of the spindle.

I have found, however, that the blank may be elongated more effectively and more expeditiously by supporting the spindle in substantially vertical position and imparting to it a series of short reciprocating movements in the direction of its length. My present invention is concerned with this improved mode of accomplishing the elongation of the blank.

While the invention herein described and claimed is of particular utility in connection with the manufacture of electric light bulbs, and as an improvement upon or modification of the machine and method of operation described in the aforesaid pending applications, it is not to be considered as limited thereto. The invention will be found applicable to use in other situations where similar conditions obtain.

A machine embodying my present invention, in a preferred form, is shown fragmentarily, but sufficiently for a complete understanding of the invention here concerned, in the accompanying drawings. In these drawings of the machine Figure 1 is a fragmentary side elevation showing certain parts in section.

Fig. 4 is a plan section on line 4—4 of Fig. 1 showing particularly the cam which controls the vertical longitudinal movements of the spindle during the process of elongating the blank.

Like characters of reference designate like parts in the several figures of the drawings.

Figure 1:
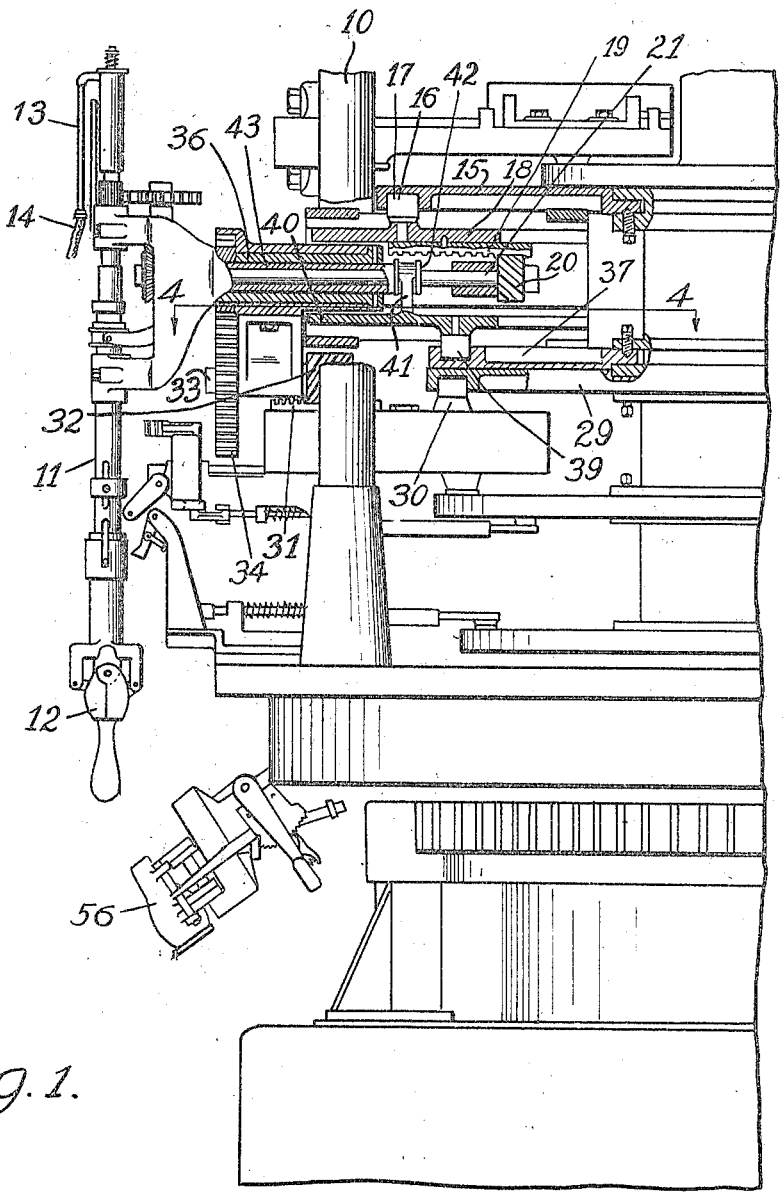

I have shown in the drawings only so much of the machine as is necessary for a clear understanding of the improvement with which my present invention is concerned.

Referring to the drawings, 10 is a rotating structure on which the several sets of glass forming devices are carried. The spindle forming an element of one of these sets of devices is indicated at 11. It is provided at one end with blank holding means 12. The spindle is hollow and compressed air is introduced into the same through an air pipe 13 having a flexible section 14.

In the illustrated embodiment the spindle receives the solid blank from the glass gathering ram (not shown) while in vertical position with the blank holding means 12 upward. With the spindle in this position air is introduced into the blank so as to blow it into hollow form. At the same time the spindle is revolved on its longitudinal axis. This operation is fully described in my co-pending applications and is accomplished by the following mechanism: 15 is a stationary cam into the camway 16 of which projects a roller 17 on a slide 18. The slide is suitably supported on the rotating structure 10. A worm rack 19 on the bottom of slide 18 is in mesh with a worm gear 20 on a shaft 21. This shaft has a bearing 22 at its outer end in the support 23 which carries, revolubly, the spindle 11, the shaft being provided at this end with a bevel pinion 24 meshing with a bevel pinion 25 on a countershaft 26 to which is keyed a gear wheel 27 in mesh with an elongated pinion 28 on the spindle.

Figure 2:
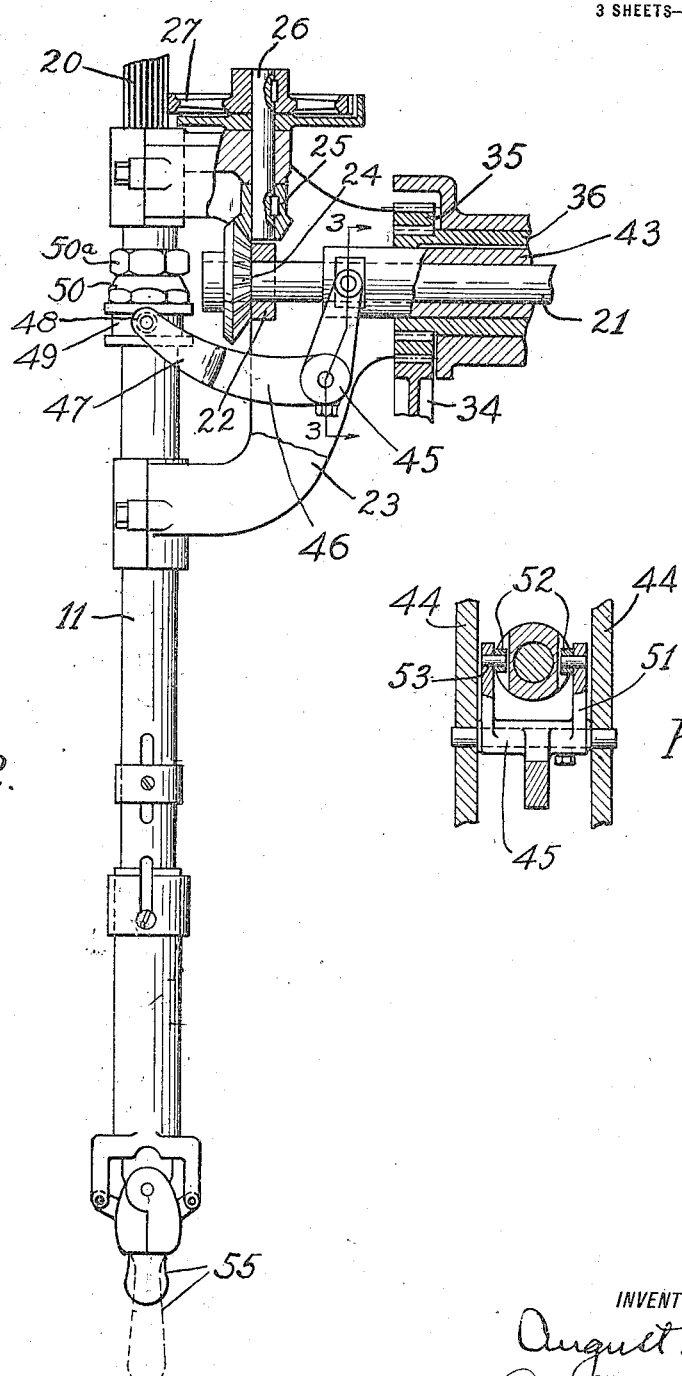
Fig. 2 is a similar view, on a larger scale, of the spindle and certain associated parts.
Figure 3:
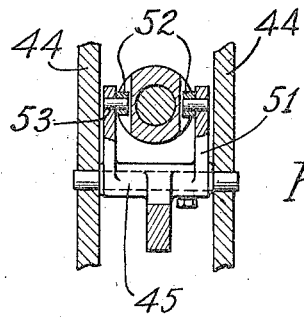
Fig. 3 is a detail section on line 3—3 of Fig. 2.

After the blank has been blown into hollow form the spindle is inverted so that it assumes the position shown in Figs. 1 and 2. This movement is accomplished by the following mechanism: 29 is a stationary cam and 30 a slide supported on the rotating structure 10 and provided with a spiral rack 31 in mesh with a spiral pinion 32 connected by shaft 33 with a gear wheel 34 which meshes with a gear wheel 35 keyed to a sleeve 36, the latter being a part of the spindle support 23.

After the spindle has been inverted it is given a series of short longitudinal movements by mechanism as follows: 37 is a stationary cam formed with a camway 38 into which projects a roller 39 on a slide 40 having radial movement on the rotating structure 10. 41 is a bracket on slide 40 terminating in a collar 42 which supports a sleeve 43 intervening between sleeve 36 and shaft 21. The spindle supporting device 23 is constructed so as to provide a pair of spaced webs 44 between which is pivoted a bell crank 45, one arm 46 of which is provided with a fork 47 adapted to engage, by means of anti-friction rollers 48 with a grooved collar 49 on the spindle 11 and adapted to bear against a stop nut 50 secured by a jam nut 50ª. The other arm of the bell crank lever 45 is in the form of a fork 51, the ends of which are provided with anti-friction rollers 52 projecting into recesses 53 in the end of the sleeve 43. The sleeve 43 is reciprocated by engagement of roller 39 with a series of lifts 54 in the camway 38. This rocks the bell crank back and forth with the result that reciprocating, longitudinal movements are imparted to the spindle, producing the elongation of the blank, the latter being indicated at 55 in the drawings. Preferably the vertical movements of the spindle producing the elongation of the blank are accompanied by the admission of compressed air in controllable volume into the blank through pipe 13 and the spindle.

If it is necessary, as in the case of the machine described in my co-pending applications above referred to, to raise the spindle a trifle when it receives the blank from the gathering device, and to lower it at the time it is inclosed by the finishing mold (shown at 56, Fig. 1), these movements may be accomplished by providing the camway 38 with lifts 57 and 58, respectively.

Operation: Assuming that the rotating part of the machine is traveling in the direction of the arrows (Fig. 4) the gather will be made at a point in the rotation of the machine in advance of bend 57 in camway 38. When roller 39 reaches lift 57 the spindle is raised and receives the blank from the gathering mechanism and immediately returns to its original position. Between 57 and the first of the lifts 54 the spindle is rotated on its axis and compressed air is introduced into the blank to blow the same into hollow form or an initial cavity is otherwise formed, after which the spindle is inverted. As the roller 39 passes through the lifts 54 of camway 38, the spindle is moved up and down to elongate the blank during which operation more air may be introduced into the blank in any desired manner. When the roller 39 reaches lift 58 the spindle is lowered and finishing mold 56 moved so that the blank is inclosed therein. Thereafter the blank may be rotated in the mold, withdrawn therefrom and discharged in any suitable manner. The spindle is then turned so as to bring the blank holding means uppermost and in readiness to receive a fresh gather.

It will be understood that the cycle of operations performed on the blank may include other operations than those described. My present invention is concerned only with the elongating of the blank. The other operations to which it is subjected have been described in a summary way and only for the purpose of making apparent the relation of the present invention to the process of manufacture as a whole.

As the operation does not tend to distort the blank, the blank or gather may be handled while hotter than is the usual practice, and the cam lifts may be of any suitable character to hasten effective elongation.

I claim:

1. In glass forming apparatus, the combination with means for holding a gather and for introducing air into the same; of mechanism for imparting reciprocating movements to the gather in the direction of its length of such predetermined number and speed as to elongate the gather.

2. In glass forming apparatus, the combination with gather holding means; of mechanism for imparting a series of short movements to the gather in the direction of its length to thereby elongate the gather.

3. In glass forming apparatus, the combination with gather holding means; and mechanism for imparting a series of short movements to the gather in the direction of its length to thereby elongate the gather, the holding means being provided with means for introducing air into the gather during the operation of elongating the same.

4. In glass forming apparatus, the combination of a rotating support, a blank holding spindle on said support adapted to be held in substantially vertical position with the blank downward, and mechanism whereby longitudinal movements are imparted to the spindle, while in the aforesaid position, to elongate the blank.

5. In glass forming apparatus, the combination of a rotating support, a blank holding spindle on said support adapted to be held in substantially vertical position with the blank downward, a cam, and connecting mechanism between the cam and spindle whereby longitudinal movements are imparted to the spindle, while in the aforesaid position, to elongate the blank; said spindle being provided with means for introducing air into the blank.

6. In glass forming apparatus, the combination of a rotating support, a blank holding spindle on said support adapted to be held in substantially vertical position with the blank downward, a cam formed with a series of short sinuosities, and connecting means between the cam and spindle whereby a series of longitudinal, reciprocating movements are imparted to the spindle while in said position for the purpose of elongating the blank.

7. In glass forming apparatus, the combination of a rotating support, a blank holding spindle on said support adapted to be held in substantially vertical position with the blank downward, a cam formed with a series of short sinuosities, and connecting means between the cam and spindle whereby a series of longitudinal, reciprocating movements are imparted to the spindle while in said position for the purpose of elongating the blank, said spindle being formed with means for introducing air into the blank.

8. Improvement in the method of making hollow glass articles which consists in elongating a gather by imparting thereto a series of short movements in the direction of its length.

9. Improvement in the method of making hollow glass articles which consists in elongating a gather by imparting thereto, while plastic, a series of short, reciprocating movements in the direction of its length.

10. Improvement in the method of making hollow glass articles which consists in blowing the gather into the form of a hollow blank and imparting a series of short movements to the blank in the direction of its length, to elongate the same.

11. Improvement in the method of making hollow glass articles which consists in blowing the gather into the form of a hollow blank, imparting a series of short movements to the blank in the direction of its length, with the blank inverted, to elongate the same, and continuing to blow air into the blank during said elongating process.

12. The process of developing a gather of glass which comprises elongating the gather while plastic by imparting thereto a series of reciprocating movements vertically and admitting air thereto in controllable volume during such operation.

AUGUST KADOW.